United States Patent
Kim et al.

(10) Patent No.: US 11,822,174 B2
(45) Date of Patent: Nov. 21, 2023

(54) BUTTON COMPOSITE STRUCTURE

(71) Applicant: TOVIS CO., LTD., Incheon (KR)

(72) Inventors: Yong Beom Kim, Incheon (KR); Joon Seog Kim, Gyeonggi-do (KR)

(73) Assignee: TOVIS CO., LTD., Incheon (KR)

( * ) Notice: Subject to any disclaimer, the term of this patent is extended or adjusted under 35 U.S.C. 154(b) by 0 days.

(21) Appl. No.: 17/798,058

(22) PCT Filed: Jan. 12, 2021

(86) PCT No.: PCT/KR2021/000362
§ 371 (c)(1),
(2) Date: Aug. 5, 2022

(87) PCT Pub. No.: WO2021/157884
PCT Pub. Date: Aug. 12, 2021

(65) Prior Publication Data
US 2023/0142581 A1    May 11, 2023

(30) Foreign Application Priority Data
Feb. 6, 2020    (KR) .......................... 10-2020-0014164

(51) Int. Cl.
*G02F 1/1333*    (2006.01)
*G02F 1/1335*    (2006.01)

(52) U.S. Cl.
CPC .... *G02F 1/13338* (2013.01); *G02F 1/133526* (2013.01); *G02F 1/133565* (2021.01)

(58) Field of Classification Search
CPC ................................................ G02F 1/13338
(Continued)

(56) References Cited

U.S. PATENT DOCUMENTS

2018/0284512 A1*    10/2018    Lee .................... G06F 1/1626

FOREIGN PATENT DOCUMENTS

| JP | 59-148022 | 10/1984 |
| JP | 01-103869 | 7/1989 |

(Continued)

OTHER PUBLICATIONS

International Search Report for PCT/KR2021/000362 dated Apr. 26, 2021 and its English Translation from WIPO (now published as WO 2021/157884).

(Continued)

*Primary Examiner* — Charles S Chang
(74) *Attorney, Agent, or Firm* — Ladas & Parry, LLP (57) ABSTRACT

A button complex structure according to one embodiment of solving the aspect may include: a display panel including a first substrate, a second substrate on the first substrate, and a liquid crystal layer between the first substrate and the second substrate; a member on the second substrate; a first coupling member configured to couple the display panel to one surface of the member; a button structure disposed on the other surface opposite to the one surface of the member; and a second coupling member configured to couple the other surface of the member to the button structure, wherein the member includes a third substrate and the button structure is directly coupled to the third substrate via the second coupling member, wherein the button structure includes a button body fixed to the third substrate, a button circuit unit fastened to the button body, a button connected to the button circuit unit, and further includes a first communication unit disposed between the member and the display panel and a second communication unit disposed in the button circuit unit.

17 Claims, 9 Drawing Sheets

(58) Field of Classification Search
USPC .......................................................... 349/12
See application file for complete search history.

(56) References Cited

FOREIGN PATENT DOCUMENTS

| JP | 2002-244764 | 8/2002 |
| KR | 10-1940992 | 1/2019 |
| WO | 2014/006756 | 1/2014 |

OTHER PUBLICATIONS

Written Opinion of the International Searching Authority for PCT/KR2021/000362 dated Apr. 26, 2021 and its English Translation by Google Translate (now published as WO 2021/157884).

\* cited by examiner

BUTTON COMPOSITE STRUCTURE

CROSS-REFERENCE TO RELATED APPLICATIONS

This application is the national stage of International Patent Application No. PCT/KR2021/000362 filed on Jan. 12, 2021, which claims priority to Korean Patent Application No. 10-2020-0014164 filed in the Korean Intellectual Property Office on Feb. 6, 2020, the disclosures of which are incorporated by reference herein in their entireties.

TECHNICAL FIELD

The present disclosure relates to a button complex structure.

BACKGROUND ART

In general, a button structure may penetrate a rigid substrate such as glass or quartz and may be fastened to a deck under the rigid substrate.

However, in the process of drilling a through hole in the rigid substrate to fasten the button structure to the deck, the rigid substrate may be damaged; in addition, this may result in greater cost consumption and a greatly reduced degree of design freedom.

Meanwhile, a display panel may be disposed under the rigid substrate, and the leakage caused by the through hole of the rigid substrate may lead to not only a defective button structure but also a defective display panel.

Furthermore, the button structure further includes a circuit unit that accommodates a button input signal, and in the case of a failure of the circuit unit, when it is difficult to fasten the button structure to the deck and separate the same therefrom, the rigid substrate has to be decomposed and the failed button structure needs be separated from the deck. This will prevent easy decomposition of the rigid substrate.

DISCLOSURE

Technical Problem

Aspects of the present disclosure provide a button complex structure including a button structure directly stacked on a rigid substrate without forming a through hole of a rigid substrate.

However, aspects of the present disclosure are not restricted to the one set forth herein. The above and other aspects of the present disclosure will become more apparent to one of ordinary skill in the art to which the present disclosure pertains by referencing the detailed description of the present disclosure given below.

Technical Solution

A button complex structure according to one embodiment of solving the aspect may include: a display panel including a first substrate, a second substrate on the first substrate, and a liquid crystal layer between the first substrate and the second substrate; a member on the second substrate; a first coupling member configured to couple the display panel to one surface of the member; a button structure disposed on the other surface opposite to the one surface of the member; and a second coupling member configured to couple the other surface of the member to the button structure, wherein the member includes a third substrate and the button structure is directly coupled to the third substrate via the second coupling member, wherein the button structure includes a button body fixed to the third substrate, a button circuit unit fastened to the button body, a button connected to the button circuit unit, and further includes a first communication unit disposed between the member and the display panel and a second communication unit disposed in the button circuit unit.

The button body may include a locking pin, the button circuit unit may include a locking groove, and the button circuit unit may be fastened to the button body by inserting the locking pin into the locking groove.

A plurality of locking pins are provided, and a plurality of locking grooves are provided, and the button circuit unit may be separated from the button body in such a way that each of the plurality of locking pins is simultaneously taken out from the locking grooves corresponding to a plurality of unlocking pins.

The button complex structure may further include a third coupling member disposed between the first communication unit and one surface of the member, and the first communication unit may be attached to one surface of the member by the third coupling member.

The button circuit unit may include a circuit board on which a button switch may be disposed, the button switch may be in contact with the button, and the button switch may receive an input signal input to the button.

The second communication unit may be disposed between the circuit board and the button body.

The second communication unit may be electrically connected to the circuit board, and the second communication unit may provide the input signal to the first communication unit when the input signal is provided to the button switch via the button.

The button complex structure may include a signal line electrically connected to the first communication unit, the signal line may include a first signal line, and the first signal line may provide the input signal provided to the first communication unit to the display panel.

The signal line may include a second signal line, the second signal line may provide the first communication unit with an on/off signal that controls on/off of the button switch, and the first communication unit may provide the on/off signal to the second communication unit.

The signal line may be disposed between the member and the display panel.

The button complex structure may further include a light emitting element disposed on the circuit board, the signal line may include a third signal line, the third signal line may provide a power signal of the light emitting element to the first communication unit, and the first communication unit may provide the power signal of the light emitting element to the first communication unit.

The light emitting element may emit light according to the input signal input to the button.

The button complex structure may further include a focus variable unit disposed to overlap the light emitting element and disposed in the button circuit unit, and the focus variable unit may change the focus of light provided from the light emitting element.

The first communication unit may include a wireless power transmitter, and the second communication unit may include a wireless power receiver.

Each of the first communication unit and the second communication unit may include a short-range communication unit.

The button may include a transparent material.

The member may further include a touch layer on the third substrate, the touch layer may include one surface of the member, and the touch layer may be coupled to the display panel by the first coupling member.

Hereinafter, various exemplary embodiments of the present disclosure will be described in detail with reference to the accompanying drawings.

Advantageous Effects

According to the button complex structure according to one embodiment, the button structure may be directly stacked on the rigid substrate without forming a through hole of the rigid substrate, which reduces damage to the rigid substrate, reduces costs, and increases the degree of design freedom.

In addition, since the through hole is not formed, a failure of the display panel and the button structure due to leakage may be reduced.

In addition, the button structure includes the button body fixed to the rigid substrate and the button circuit unit including the circuit unit, so that only the button circuit unit may be easily replaced when the circuit unit fails.

In addition, since the operation of the button complex structure is controlled via wireless communication units (including a transmitter and receiver), the signal line connected to the circuit board does not need to penetrate the rigid substrate. Accordingly, the reliability of the button complex structure may be ensured.

The effects according to the present disclosure are not limited to the above-described contents, and other various effects are included in the present specification.

MODE FOR DISCLOSURE

The merits and characteristics of the present disclosure and a method for achieving the merits and characteristics will become more apparent from the embodiments described in detail in conjunction with the accompanying drawings. However, the present disclosure is not limited to the disclosed embodiments, but may be implemented in various different ways. The embodiments are provided to only complete the disclosure of the present disclosure and to allow those skilled in the art to understand the category of the present disclosure. The present disclosure is defined by the category of the claims.

Indicating that elements or layers are "on" other elements or layers include both a case in which the corresponding elements are just above other elements and a case in which the corresponding elements are intervened with other layers or elements. The same reference numerals indicate the same elements throughout the specification.

Although the terms first, second, etc. may be used to describe various elements, it should be understood that these elements are not limited by these terms. These terms are only used to distinguish one element from another. For example, a first element to be described below could be termed as a second element, without departing from the scope of exemplary embodiments.

Figure 1:
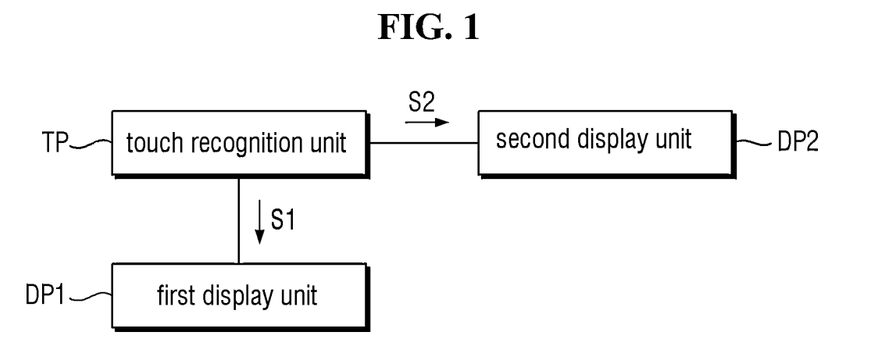
FIG. 1 is a block diagram of a button complex structure according to one embodiment.

Hereinafter, various embodiments of the present disclosure will be described with reference to the attached drawings:

FIG. 1 is a block diagram of a button complex structure according to one embodiment.

Referring to FIG. 1, the button complex structure according to one embodiment may include a touch recognition unit TP, a first display unit DP1, and a second display unit DP2.

The touch recognition unit TP may serve to recognize a touch input. For example, when a touch input is performed on the button complex structure, the touch recognition unit TP may generate touch input signals S1 and S2.

The first display unit DP1 may include a display panel configured to display an image. A liquid crystal display panel may be applied as the display panel. Although the liquid crystal display panel is described as an example of the display panel in the following description, the display panel is not limited thereto, and may be applied to an electrophoresis display panel, an organic light emitting display panel, a micro-LED display panel, a plasma display panel, an electric field emission display panel, a cathode-ray display panel, and so forth.

The first display unit DP1 may be electrically connected to the touch recognition unit TP. The first display unit DP1 may receive a touch input signal S1 generated by the touch recognition unit TP and display a screen corresponding to the touch input signal S1.

The second display unit DP2 may include a light emitting element configured to emit light. Relevant examples of the light emitting element include LEDs. That is, the second display unit DP2 may include an LED light emitting element. However, the present disclosure is not limited thereto, and the second display unit DP2 may include a halogen lamp, an incandescent bulb, or three wavelengths.

The second display unit DP2 may be electrically connected to the touch recognition unit TP. The second display unit DP2 may receive a touch input signal S2 generated by the touch recognition unit TP and emit light corresponding to the touch input signal S2.

In some embodiments, the second display unit DP2 may emit light regardless of the touch input signal S2 generated by the touch recognition unit TP.

Hereinafter, a more detailed structure of the button complex structure according to one embodiment will be described. The drawing reference numerals of each component of the button complex structure in FIG. 1 described above are described for convenience of description and may differ from the drawing reference numerals of each component of the button complex structure to be described below.

Figure 2:
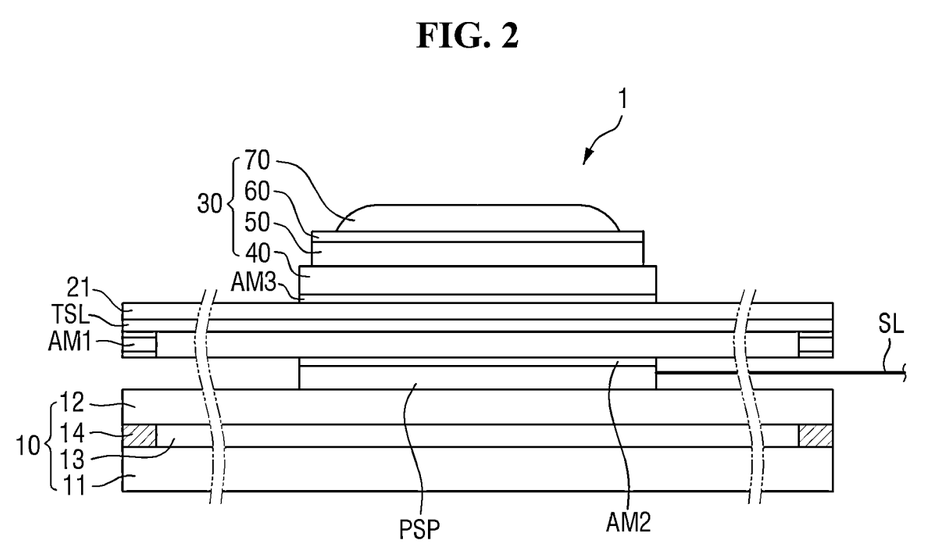
FIG. 2 is a cross-sectional view of the button complex structure according to one embodiment.

FIG. 2 is a cross-sectional view of the button complex structure according to one embodiment.

Referring to FIG. 2, a button complex structure 1 according to one embodiment may include a display panel 10, a member 20, and a button structure 30.

The display panel 10 may include the same structure as the first display unit DP1 in FIG. 1 described above.

The display panel 10 may include a first substrate 11, a second substrate 12 that faces the first substrate 11, and a liquid crystal layer 13 interposed between the first substrate 11 and the second substrate 12. A sealing member 14 is disposed at the edges of the first substrate 11 and the second substrate 12, and couples the first substrate 11 and the second substrate 12 to prevent liquid crystal molecules of the liquid crystal layer 13 from leaking to the outside.

One of the first substrate 11 and the second substrate 12 may be a thin film transistor substrate, and the other may be a color filter substrate. In the present embodiment, it is described that the first substrate 11 is the thin film transistor substrate and the second substrate 12 is the color filter substrate. A display direction may be an outer direction of an upper surface of the second substrate 12. The second substrate 12 may be disposed above the first substrate 11 based on the display direction. Accordingly, the second substrate 12 may be an upper substrate, and the first substrate 11 may be a lower substrate.

Each of the first substrate 11 and the second substrate 12 may include an insulating substrate made of glass or quartz, and structures such as a wiring, a metal, a semiconductor layer, an insulating film, a color filter, and a black matrix disposed thereon. Each of the structures may be disposed on one surface where the insulating substrate of the first substrate 11 faces the insulating substrate of the second substrate 12. For convenience, an illustration of the structure disposed on the insulating substrate is omitted in the drawing, and only the shapes of the first substrate 11 and the second substrate 12 are illustrated. Hereinafter, when referring to a rear shape of the first substrate 11 or the second substrate 12, the corresponding shape may refer to a rear shape of the insulating substrate of the first substrate 11 or a rear shape of the insulating substrate of the second substrate 12.

A member 20 attached to the display panel 10 may be disposed on the display panel 10.

The member 20 may include a third substrate 21 and a touch layer TSL. The touch layer TSL may be disposed on the third substrate 21. The touch layer TSL may be disposed between the third substrate 21 and the second substrate 12.

A first coupling member AM1 may be disposed between the touch layer TSL and the second substrate 12. The touch layer TSL and the second substrate 12 may be coupled to each other via the first coupling member AM1. The first coupling member AM1 may be a double-sided tape, but the present disclosure is not limited thereto, and a conventional coupling member may be applied to the first coupling member AM1.

The first coupling member AM1 may be disposed in both ends between the touch layer TSL and the second substrate 12. That is, a gap may be disposed between the touch layer TSL and the second substrate 12 in a central portion where the first coupling member AM1 is not disposed. The touch layer TSL and the second substrate 12 may be spaced apart from each other via the gap.

The third substrate 21 may be an insulating substrate made of glass or quartz. The third substrate 21 may include the same material as the first substrate 11. The planar size of the third substrate 21 may be identical to the planar size of the second substrate 12, but the present disclosure is not limited thereto.

The touch layer TSL may be disposed on one surface of the third substrate 21 that faces the second substrate 12.

The touch layer TSL may include a plurality of touch electrodes and a touch insulating layer that covers the plurality of touch electrodes. The touch electrode may include a conductive material, and the touch insulating layer may include an inorganic material or an organic material.

The plurality of touch electrodes may be disposed on one surface of the third substrate 21, and the touch insulating layer may be disposed on the plurality of touch electrodes to cover the plurality of touch electrodes.

The touch insulating layer may be in direct contact with the first coupling member AM1. The touch insulating layer may be attached to the second substrate 12 via the first coupling member AM1.

The touch layer TSL may sense a touch input signal applied on the other surface which is a surface opposite to one surface of the third substrate 21. The touch layer TSL may obtain coordinates of a touch input point in a capacitive way. The capacitance way may obtain coordinate information of a point touched by the self-capacitance manner or the mutual capacitance manner.

A button structure 30 may be disposed on the member 20. The button structure 30 may be disposed on the other surface of the third substrate 21. That is, the touch layer TSL may be disposed between the button structure 30 and the touch insulating layer, and the member 20 may be disposed between the button structure 30 and the display panel 10.

In some embodiments, the touch layer TSL of the member 20 may be omitted. In that case, the third substrate 21 of the member 20 may be in direct contact with the first coupling member AM1 and may be coupled to the display panel 10 via the first coupling member AM1.

The button structure 30 may include a button body 40, a button circuit unit 50, a light emitting unit 60, and a button 70.

Meanwhile, a first communication unit PSP may be disposed on one surface (lower surface) that faces the display panel 10 in the drawing of the member 20. The first communication unit PSP may be disposed between the member 20 and the display panel 10. A second coupling member AM2 may be disposed between the first communication unit PSP and the member 20. That is, the first communication unit PSP may be attached to the member 20 via the second coupling member AM2. The first communication unit PSP may include the wireless power transmitter. The first communication unit PSP may include a short-range communication unit in some embodiments.

A signal line SL may be connected to the first communication unit PSP. The signal line SL may be electrically connected to the first communication unit PSP and extend in the right direction in the drawing. The signal line SL may be disposed between the member 20 and the display panel 10 and may extend to penetrate the first coupling member AM1.

A third coupling member AM3 may be disposed between the button structure 30 and the third substrate 21. The third coupling member AM3 may be an adhesive, but the present disclosure is not limited thereto.

The button body 40 may be in direct contact with the third coupling member AM3. The button body 40 may be directly attached and fixed to another surface of the third substrate 21 via the third coupling member AM3.

The button circuit unit 50 may be fastened to the button body 40, and the button 70 may be connected to the button circuit unit 50.

Although not illustrated in the drawings, a circuit board (see "51" in FIG. 4) and a second communication unit (see "PRP" in FIG. 4) may be further disposed in the button circuit unit 50.

Figure 3:
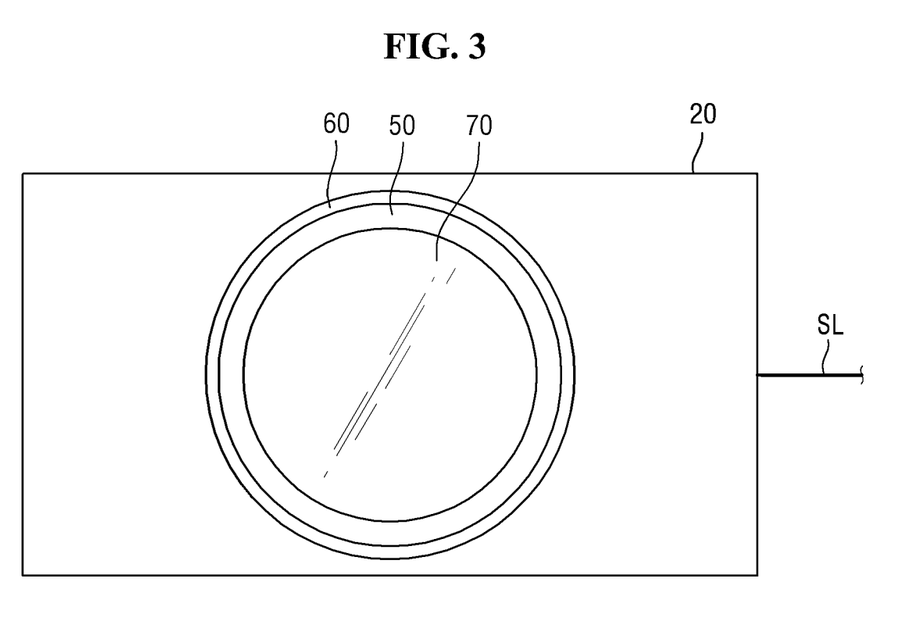
FIG. 3 is a top plan view of the button complex structure according to one embodiment.

FIG. 3 is a top plan view of the button complex structure according to one embodiment.

Referring to FIG. 3, the planar shapes of the button circuit unit 50 and the light emitting unit 60 may include a ring shape including a circular opening. The planar shape of the button 70 may include a circular shape. However, the present disclosure is not limited thereto, and the planar shapes of the button circuit unit 50 and the light emitting unit 60 include an opening at the center thereof, and there is no limitation as long as the shape surrounds the opening. In addition, the planar shape of the button 70 is not limited thereto, and may include a rectangle, a square, an oval, or another polygon.

In the described embodiment, the shape of the opening of the button circuit unit 50 may be identical to the planar shape of the button 70. However, the present disclosure is not limited thereto, and the shape of the opening of the button circuit unit 50 may differ from the planar shape of the button 70.

Figure 4:
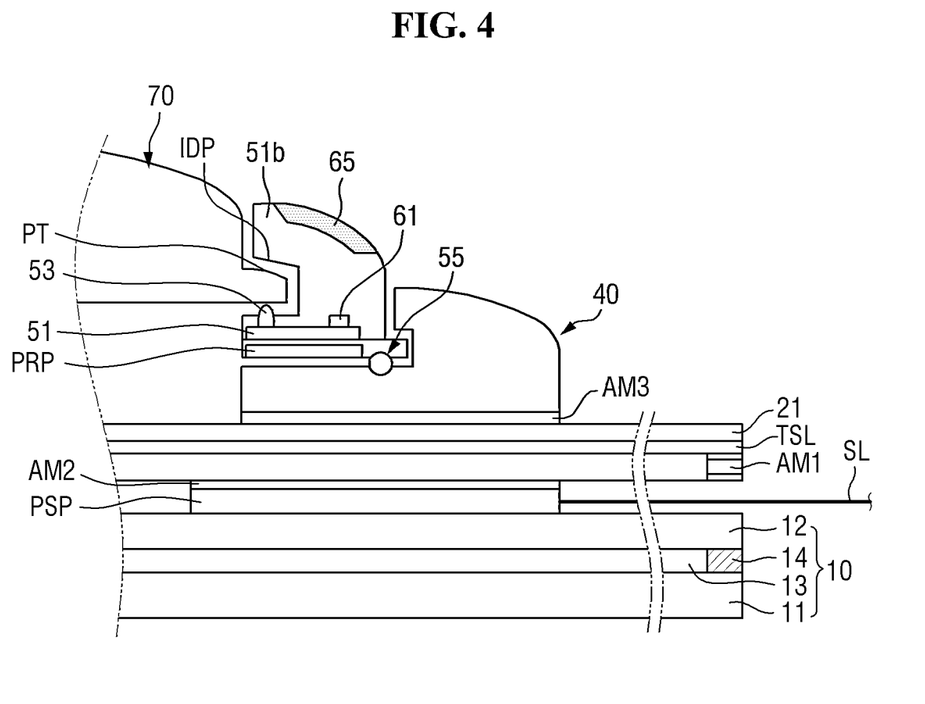
FIG. 4 is a cross-sectional view of the button complex structure according to one embodiment.

FIG. 4 is a cross-sectional view of the button complex structure according to one embodiment.

Referring to FIG. 4, the button body 40 may be divided into a first portion forming a lower line and a second portion protruding from the first portion, but the present disclosure is not limited thereto. A locking pin 45 may be disposed in the first portion of the button body 40. The locking pin 45 may protrude from the first portion of the button body 40 in a thickness direction.

A button circuit unit 50 may be disposed on the button body 40. The button circuit unit 50 may be disposed in an upper portion of the first portion of the button body 40 and on the left side of the second portion thereof.

A locking groove 55 may be disposed on a lower surface of the button body 40. The locking groove 55 may include a shape indented upwards from the lower surface of the button body 40.

The button circuit unit 50 may have a lock/unlock relationship with the button body 40 in such a way that the locking pin 45 is inserted into the locking groove 55. That is, when the locking pin 45 is inserted into the locking groove 55, the button circuit unit 50 may have a fastening relationship (lock state) with the button body 40, and when the locking pin 45 is taken out from the locking groove 55, the button circuit unit 50 may have a separation relationship (unlock state) with the button body 40.

The inserting/taking-out relationship between the locking groove 55 and the locking pin 45 will be described below with reference to FIGS. 5 to 9.

The button circuit unit 50 may include a circuit board 51. A button switch 53 and a light emitting element 61 of the light emitting unit 60 may be disposed on the circuit board 51. The light emitting unit 60 may have the same configuration as the second display unit DP2 in FIG. 1 described above.

Relevant examples of the light emitting element 61 may include LEDs. That is, the light emitting element 61 may include an LED light emitting element. However, the present disclosure is not limited thereto, and the light emitting element 61 may include a halogen lamp, an incandescent bulb, or three wavelengths.

Although not illustrated, the circuit board 51 may be electrically connected to a second communication unit PRP to be described below.

The button switch 53 may be disposed on the circuit board 51 and may be disposed to protrude from a surface of the button circuit unit 50.

The button 70 may be disposed on a side surface of the button circuit unit 50 and may be disposed on an upper part of the button switch 53 of the button circuit unit 50. The button 70 may be in direct contact with the button switch 53.

The button 70 may include a transparent material.

A focus variable unit 65 may be further disposed on an upward surface of the light emitting unit 60 of the button circuit unit 50.

The focus variable unit 65 may be disposed to overlap the light emitting element 61 in the thickness direction.

The focus variable unit 65 may serve to variably control the focus of light emitted from the light emitting element 61. For example, the focus variable unit 65 may include an optical lens.

The button circuit unit 50 may include an indentation pattern IDP where a part of the portion facing the button 70 is indented in the direction moving away from the button 70. That is, the indentation pattern IDP may include a shape indented in the right direction in the drawing from a side surface facing the button 70 of the button circuit unit 50.

The button circuit unit 50 may include a "⊏" cross-sectional shape inverted left and right by the indentation pattern IDP of the button circuit unit 50. The button switch 53 may have a shape protruding from a lower side (or line) of the left and right inverted "⊏" cross-sectional shape.

The button 70 may be disposed on the side surface of the button circuit unit 50 and may be disposed between a lower side (or line) and an upper side (or line) among the left and right inverted "⊏" cross-sectional shape of the button circuit unit 50. The button 70 may include a protruding pattern PT protruding towards the indentation pattern IDP of the button circuit unit 50. The protruding pattern PT may include a shape protruding towards the right side in the drawing. The protruding pattern PT may be in direct contact with the button switch 53.

The button circuit unit 50 may include a first sub-circuit unit 50a and a second sub-circuit unit 50b classified according to positions. The first sub-circuit unit 50a may be disposed below the button circuit unit 50, and the second sub-circuit unit 50b may be disposed above the button circuit unit 50. The aforementioned circuit board 51 may be disposed in the second sub-circuit unit 50b. A second communication unit PRP may be disposed in the first sub-circuit unit 50a. The second communication unit PRP may be disposed between the circuit board 51 and the button body 40.

The second communication unit PRP may include a wireless power receiver. The second communication unit PRP may include the short-range communication unit in some embodiments.

Hereinafter, an operation of the button complex structure 1 will be described in more detail.

A physical touch signal may be input via the button 70. The physical touch signal may be a physical pressure. Hereinafter, the physical touch signal will be referred to as an input signal.

The physical touch signal may be input via the button 70. Hereinafter, the physical touch signal will be referred to as an input signal. The button switch 53 may receive an input signal input to the button 70.

The second communication unit PRP may be electrically connected to the circuit board 51. The button complex structure 1 according to one embodiment may provide the input signal to the first communication unit PSP when the input signal is provided to the button switch 53 via the button 70.

In this case, each of the first communication unit PSP and the second communication unit PRP may include the short-range communication unit.

A plurality of signal lines SL may include a first signal line, a second signal line, a third signal line, and a fourth signal line. A plurality of signal lines SL may be electrically connected to the first communication unit PSP.

The first signal line may provide the input signal provided to the first communication unit PSP to the display panel 10.

That is, when the input signal is applied to the first communication unit PSP, the first signal line connected to the first communication unit PSP may provide the input signal to the display panel 10 and the display panel 10 may output a screen according to the input signal.

The second signal line may provide the first communication unit PSP with an on/off signal that controls on/off of the button switch 53.

When the second signal line provides the on/off signal of the button switch 53 to the first communication unit PPSP, the first communication unit PPSP provides the on/off signal to the second communication unit PRP, thus controlling the on/off signal of the button switch 53.

In this case, the first communication unit PSP may include the wireless power transmitter, and the first communication unit PSP may include the wireless power receiver.

The third signal line may provide the power signal of the light emitting element 61 to the first communication unit PSP. That is, when the power signal of the light emitting element 61 is provided to the first communication unit PPSP via the third signal line, the first communication unit PPSP may transmits the applied power signal to the second communication unit PRP.

The fourth signal line may emit light according to the input signal obtained by inputting the light emitting element 61 to the button 70.

In other words, when the input signal is applied to the button 70, the input signal may be provided to the second communication unit PRP connected to the circuit board 51, and the input signal provided to the second communication unit PRP may be provided to the first communication unit PSP. The input signal provided to the first communication unit PSP may be transmitted to a main controller via the fourth signal line, a signal for controlling a light emitting event of the light emitting element 61 may be provided from the main controller back to the first communication unit PSP, and the light emitting event signal provided to the first communication unit PSP may be provided to the second communication unit PRP and then provided to the light emitting element 61 of the circuit board.

In some embodiments, when the fourth signal line is omitted, and the input signal is generated in the button 70 via the button switch 53, the light emitting element 61 may emit light right away via the circuit board 51.

Figure 5:
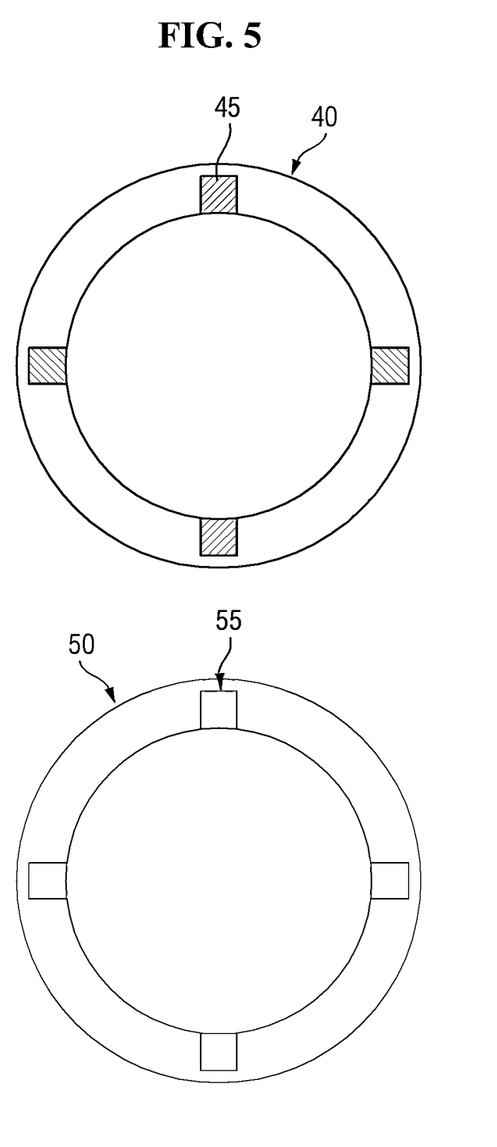
FIG. 5 is a top plan view illustrating a button body and a button circuit unit according to one embodiment.
Figure 6:
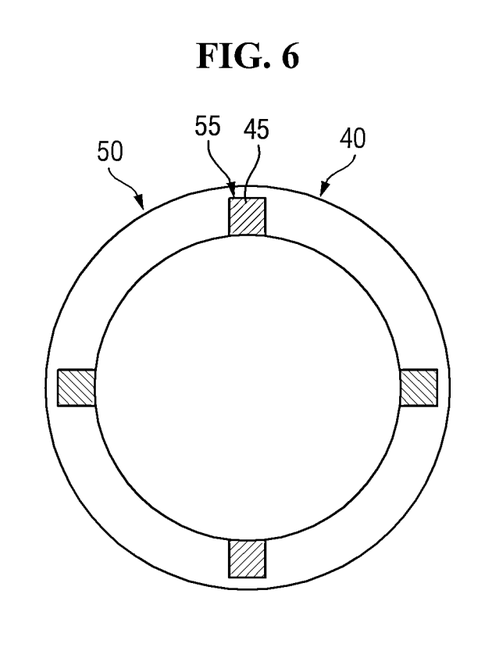
FIG. 6 is a top plan view illustrating a state where the body portion button body and the button circuit unit are fastened according to one embodiment.
Figure 7:
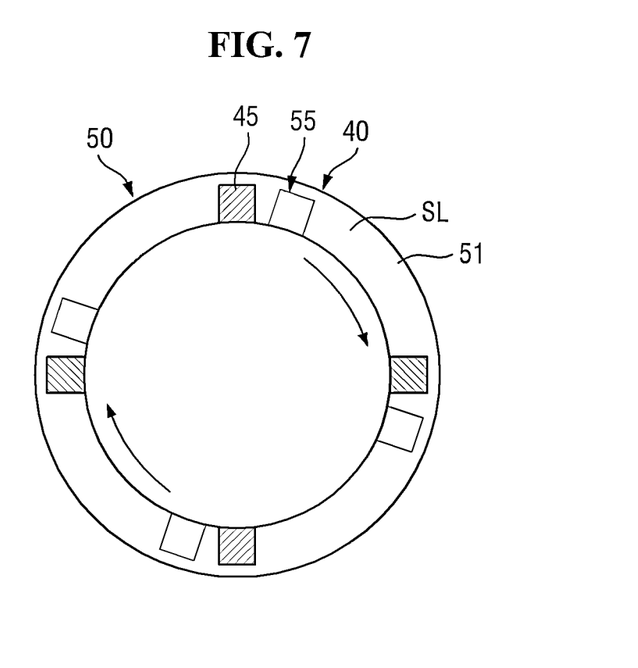
FIG. 7 is a top plan view illustrating a state where the button body and the button circuit unit are disassembled according to one embodiment.
Figure 8:
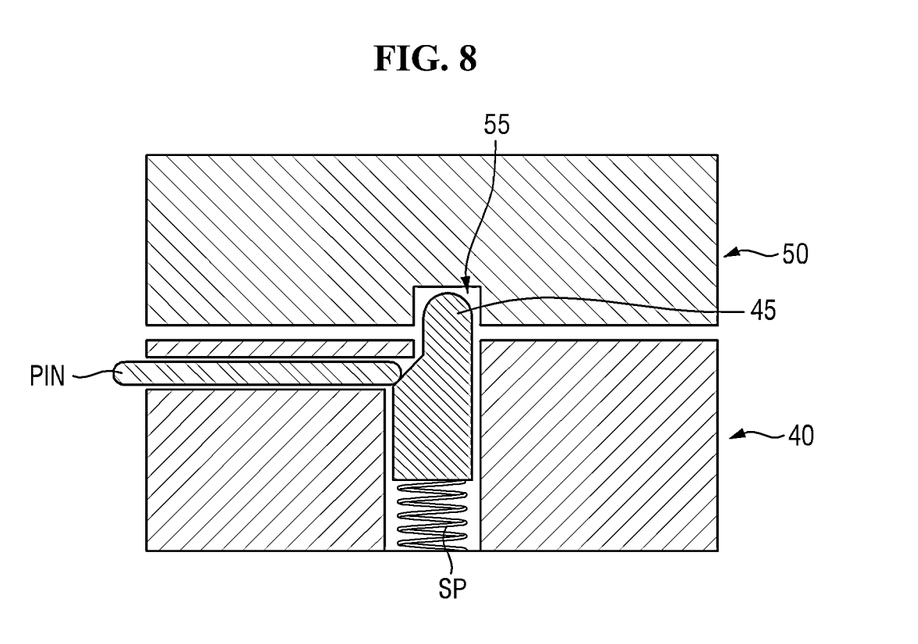
FIG. 8 is a cross-sectional view illustrating a state where the button and the button circuit unit are fastened according to one embodiment.
Figure 9:
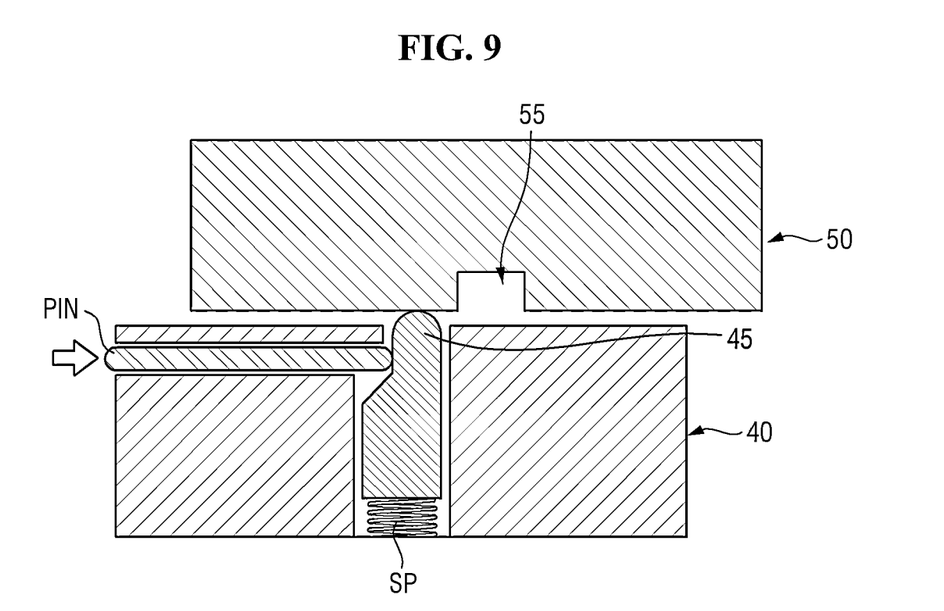
FIG. 9 is a cross-sectional view illustrating a state where the button body and the button circuit are disassembled according to one embodiment.

FIG. 5 is a top plan view illustrating a button body and a button circuit according to one embodiment. FIG. 6 is a top plan view illustrating a state where the body portion button body and the button circuit unit are fastened according to one embodiment. FIG. 7 is a top plan view illustrating a state where the button body and the button circuit unit are disassembled according to one embodiment. FIG. 8 is a cross-sectional view illustrating a state where the button and the button circuit unit are fastened according to one embodiment. FIG. 9 is a cross-sectional view illustrating a state where the button body and the button circuit are disassembled according to one embodiment.

First, referring to FIG. 5, a plurality of locking pins 45 of the button body 40 may be provided. The arrangement of the locking pin 45 illustrated in the drawings is not limited thereto.

A plurality of locking grooves 55 of the button circuit 50 may be provided. In one embodiment, the number of locking grooves 55 may be identical to the number of locking pins 45.

Referring to FIG. 6, the plurality of locking pins 45 and the plurality of locking grooves 55 may overlap each other in the thickness direction.

The locking pin 45 protruding from a surface of the button body 40 in the thickness direction may be inserted into the locking groove 55 indented upwards from a bottom surface of the button body 40. Each of the plurality of locking pins 45 may be inserted into the locking grooves 55 corresponding to the thickness direction thereof.

In this way, the locking groove 55 may have a lock/unlock relationship with the button body 40 in such a way that the locking pin 45 is inserted into the locking groove 55.

The locking pin 45 may include an insertion portion inserted into the locking groove 55, a body portion connected to a lower part of the insertion portion, and an elastic portion SP connected to a lower part of the body portion. In the cross-sectional view, the width of the insertion portions may be smaller than that of the body portion and the elastic portions SP, respectively. A portion of the body portion protruding to one side from the insertion portion may have a shape inclined in the cross-sectional view.

Referring to FIG. 7, as in the embodiment of FIG. 6, the button circuit unit 50 coupled to the button body 40 may rotate clockwise (as illustrated in the drawing) or counter-clockwise, thus separating the button circuit unit 50 from the button body 40. However, even if the button circuit unit 50 is rotated due to the locking pin 45 inserted into the locking groove 55, the locking pining 45 may not be easily taken out from the locking groove 55.

Referring to FIGS. 8 and 9, the button circuit unit 50 may be separated from the button body 40 in such a way that the locking pin 45 is taken out from the locking groove 55 by an unlocking pin PIN.

In other words, the unlocking pin PIN may press a portion protruding and inclined to one side from the insertion portion of the body portion of the locking pin 45 in the direction of the other side opposite to the one side, thereby taking out the insertion portion of the locking pin 45 from the locking groove 55.

As described above, the locking pin 45 according to one embodiment further includes the elastic portion SP connected to the bottom of the body portion, and the elastic portion SP may include a spring. The elastic portion SP may serve to facilitate taking out the insertion portion from the locking groove 55 by allowing the locking pin 45 to easily move downwards when the portion protruding and inclined to one side from the insertion portion of the body portion of the locking pin 45 is pressed in the direction of the other side opposite to the one side via the unlocking pin PIN.

Since there are the plurality of locking grooves 55 and the plurality of locking pins 45 corresponding to each other according to one embodiment, the button body 40 and the button circuit 50 may be completely separated from each other only when the plurality of locking pins 45 are simultaneously moved downwards.

In other words, the button circuit unit 50 may be completely separated from the button body 40 in such a way that the plurality of locking pins 45 corresponding to each of the plurality of locking grooves 55 are simultaneously taken out by means of the plurality of unlocking pins PINs.

As illustrated in FIG. 9, when the insertion portion is taken out from the locking groove 55, the button circuit unit 50 coupled to the button body 40 may rotates clockwise (illustrated in the drawings) or counterclockwise, thus separating the button circuit unit 50 from the button body 40.

When the button structure penetrates the third substrate and is fastened to the deck of the bottom of the third substrate, the process of drilling a through hole in the third substrate to fasten the button structure to the deck may cause damage to the third substrate as well as increase cost consumption and reduce the degree of design freedom.

However, according to the button complex structure 1 according to one embodiment, the button structure 30 is directly stacked on the third substrate 21 without forming the through hole of the third substrate 21, thereby reducing damage to the third substrate 21, reducing costs, and increasing the degree of design freedom.

In addition, when the button structure is fastened to the deck of the bottom of the third substrate via the through hole of the third substrate, defects of the display panel and the button structure may occur due to leakage by the through hole of the third substrate.

However, in the case of the button complex structure 1 according to one embodiment, since the through hole is not formed in the third substrate 21, a failure of the display panel 10 and the button structure 30 caused by the leakage may be reduced.

Furthermore, the button structure further includes the circuit unit that receives the button input signal, and in the case of a failure of the circuit unit, when the button structure has difficulty being separated from the deck after the fastening thereof, the third substrate has to be decomposed to separate the failed button structure from the deck. In that case, since the third substrate is not easily decomposed, repair of the button structure may be time-consuming.

However, according to the button complex structure 1 according to one embodiment, the button body 40 not including the circuit unit including the circuit board 51 may be fixed to the third substrate 21 and the button circuit 50 including the circuit unit is locked/unlocked with the button body 40, and accordingly, when the circuit unit fails, only the button circuit unit 50 can be easily replaced to repair the button structure in a short time.

Furthermore, by providing the plurality of locking grooves 55 and the plurality of locking pins 45 of the button complex structure 1 according to one embodiment which correspond to each other, the button circuit unit 50 needs to be completely separated from the body portion button body 40 in such a way that the plurality of locking pins 45 corresponding to each of the plurality of locking grooves 55 are simultaneously taken out by the plurality of unlocking pins PINs, thereby easily preventing theft of the button body 40 and the bottom 70.

Furthermore, by controlling the operation of the button complex structure 1 via the wireless communication units (PSP and PRP of one embodiment), the signal line may not be physically connected to the circuit board 51 and the signal line may not penetrate the third substrate 21 as a rigid substrate. This will ensure the reliability of the button complex structure 1.

Although the embodiments of the present disclosure have been described above with reference to the accompanying drawings, the present disclosure is not limited to the disclosed embodiments, but may be implemented in various different ways, and the present disclosure may be embodied in many different forms without changing technical subject matters and essential features as will be understood by those skilled in the art. Therefore, embodiments set forth herein are exemplary only and not to be construed as a limitation.

The invention claimed is:

1. A button complex structure, comprising:
 a display panel including a first substrate, a second substrate on the first substrate, a liquid crystal layer between the first substrate and the second substrate;
 a member on the second substrate;
 a first coupling member configured to couple the display panel to one surface of the member;
 a button structure disposed on the other surface opposite to the one surface of the member; and
 a second coupling member configured to couple the other surface of the member to the button structure,
 wherein the member includes a third substrate and the button structure is directly coupled to the third substrate via the second coupling member,
 wherein the button structure comprises:
 a button body fixed to the third substrate;
 a button circuit unit fastened to the button body;
 a button connected to the button circuit unit, and
 further comprises a first communication unit disposed between the member and the display panel and a second communication unit disposed in the button circuit unit.

2. The button complex structure of claim 1, wherein the button body includes a locking pin, the button circuit unit includes a locking groove, and the button circuit unit is fastened to the button body by inserting the locking pin into the locking groove.

3. The button complex structure of claim 2, wherein a plurality of locking pins are provided, and a plurality of locking grooves are provided, and the button circuit unit is separated from the button body in such a way that each of the plurality of lock pins is simultaneously taken out from the lock grooves corresponding to a plurality of unlocking pins.

4. The button complex structure of claim 1, further comprising a third coupling member disposed between the first communication unit and one surface of the member,
 wherein the first communication unit is attached to one surface of the member by the third coupling member.

5. The button complex structure of claim 1, wherein the button circuit unit includes a circuit board on which a button switch is disposed, the button switch is in contact with the button, and the button switch receives an input signal input to the button.

6. The button complex structure of claim 5, wherein the second communication unit is disposed between the circuit board and the button body.

7. The button complex structure of claim 6, wherein the second communication unit may be electrically connected to the circuit board, and the second communication unit provides the input signal to the first communication unit when the input signal is provided to the button switch via the button.

8. The button complex structure of claim 7, comprising a signal line electrically connected to the first communication unit,
 wherein the signal line includes a first signal line, and the first signal line provides the input signal provided to the first communication unit to the display panel.

9. The button complex structure of claim 8, wherein the signal line includes a second signal line, the second signal line provides the first communication unit with an on/off signal that controls on/off of the button switch, and the first communication unit provides the on/off signal to the second communication unit.

10. The button complex structure of claim 8, wherein the signal line is disposed between the member and the display panel.

11. The button complex structure of claim 10, further comprising a light emitting element disposed on the circuit board,
wherein the signal line includes a third signal line, the third signal line provides a power signal of the light emitting element to the first communication unit, and the first communication unit provides the power signal of the light emitting element to the first communication unit.

12. The button complex structure of claim 11, wherein the light emitting element emits light according to the input signal input to the button.

13. The button complex structure of claim 12, further comprising a focus variable unit disposed to overlap the light emitting element and disposed in the button circuit unit,
wherein the focus variable unit changes the focus of light provided from the light emitting element.

14. The button complex structure of claim 5, wherein the first communication unit includes a wireless power transmitter, and the second communication unit includes a wireless power receiver.

15. The button complex structure of claim 5, wherein each of the first communication unit and the second communication unit may include a short-range communication unit.

16. The button complex structure of claim 1, wherein the button may include a transparent material.

17. The button complex structure of claim 1, wherein the member further includes a touch layer on the third substrate, the touch layer includes one surface of the member, and the touch layer is coupled to the display panel by the first coupling member.

* * * * *